United States Patent [19]

Element et al.

[11] Patent Number: 5,532,560

[45] Date of Patent: Jul. 2, 1996

[54] PHOTOSENSITIVE AUTOMATIC BLIND CONTROLLER

[75] Inventors: Richard G. Element, Tottenham; Roger A. Morris, Oshawa, both of Canada

[73] Assignee: Sun Dial Industries, Inc., Tottenham, Canada

[21] Appl. No.: 337,468

[22] Filed: Nov. 8, 1994

[51] Int. Cl.⁶ .............................. E05F 15/20; H02P 1/22; H02P 1/54
[52] U.S. Cl. .................. 318/266; 318/286; 318/468; 318/480; 318/112; 160/5; 49/25
[58] Field of Search ................................ 318/626, 652, 318/663, 666, 264, 265, 266, 286, 466, 467, 468, 480, 41, 53, 54, 83, 101, 112; 49/25, 31; 160/5

[56] References Cited

U.S. PATENT DOCUMENTS

| | | |
|---|---|---|
| 2,798,194 | 7/1957 | Cantin . |
| 2,962,647 | 11/1960 | Borenstein . |
| 3,096,078 | 7/1963 | Steingass et al. . |
| 3,294,150 | 12/1966 | Thomas . |
| 3,294,151 | 12/1966 | Hartley et al. . |
| 3,294,152 | 12/1966 | Kuijvenhoven . |
| 3,438,423 | 4/1969 | Melull et al. . |
| 3,646,985 | 3/1972 | Klann . |
| 3,675,023 | 7/1972 | Kunke et al. . |
| 3,885,152 | 5/1975 | Anetseder, Sr. et al. . |
| 4,031,944 | 6/1977 | Morrison et al. . |
| 4,471,275 | 9/1984 | Comeau . |
| 4,501,963 | 2/1985 | Perisic . |
| 4,610,294 | 9/1986 | Anesi et al. . |
| 4,727,918 | 3/1988 | Schroeder . |
| 4,819,708 | 4/1989 | Onosato et al. . |
| 4,864,201 | 9/1989 | Bernot . |

FOREIGN PATENT DOCUMENTS 1148634  6/1983  Canada .

*Primary Examiner*—Bentsu Ro
*Attorney, Agent, or Firm*—Hill & Schumacher

[57] ABSTRACT

There is disclosed a photosensitive automatic controller for use with window coverings in particular for use with venetian blinds. The controller includes a reversible motor, a drive circuit, a photosensitive sensor, a user input, a control signal processor, a command circuit and a feedback sensor. The reversible motor is operably connected to the opening and closing device and it has a predetermined range from open to closed which corresponds to the window covering being fully opened and fully closed. The drive circuit is operably connected to the motor for generating a drive signal which drives the motor in a predetermined range from opened to closed. The photosensitive sensor generates a sensor signal. The user input generates an input signal. The control signal processor is operably connected to the photosensitive sensor and the user input and the sensor signal is combined with the input signal to produce a control signal. The feedback sensor is operably connected to the opening and closing device and generates a feedback signal. The command circuit is operably connected to the drive circuit, control signal processor and feedback sensor and compares the feedback signal to the control signal and produces a command signal which is transmitted to the drive circuit. The controller may include a comparator for ensuring that at night when it is dark the blinds are closed. Further, the controller may be adapted so that a series of blinds may be ganged together with one blind being a master and the remaining being slaves.

18 Claims, 6 Drawing Sheets

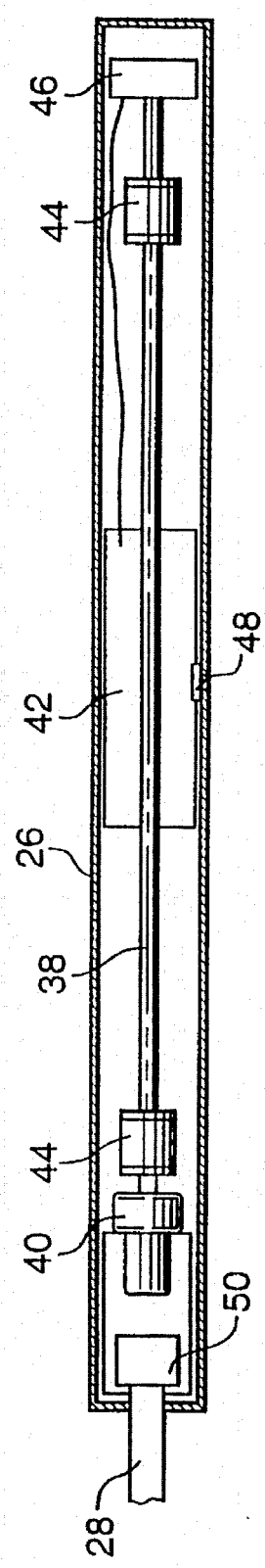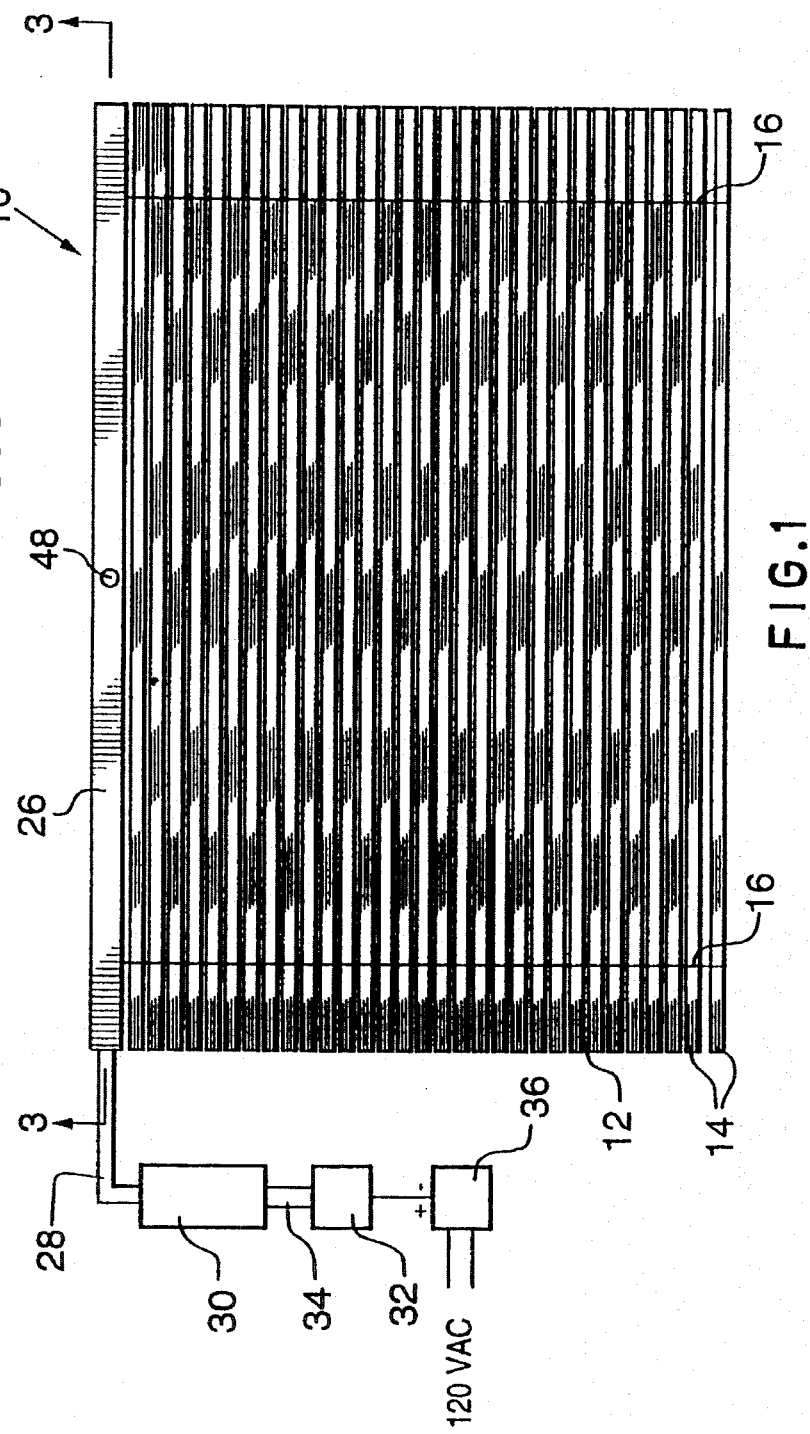

PHOTOSENSITIVE AUTOMATIC BLIND CONTROLLER

FIELD OF THE INVENTION

The present invention relates to adjustable blinds whereby varying the position of the blind varies the amount of light that is allowed past the blind. More particularly, the invention relates to a photosensitive controller device for automatically varying the position of the blind between fully open and fully closed.

BACKGROUND OF THE INVENTION

Adjustable blinds are commonly used in both commercial and residential buildings. The style of blind used in each building may be chosen from a variety of different styles and colours and may be chosen for aesthetic, economic and/or privacy reasons. Typically the blinds include a plurality of vertical or horizontal slats which are connected together. The slats are synchronously adjustable between a closed position, where adjacent slats overlap to block out the light, and a fully open position, where the slats parallel to each other and generally perpendicular to the plane of the window so the maximum amount of light is admitted into the room through the blind. Intermediate positions may be used to vary the amount of light allowed past the blind.

It is well known that the intensity of the sun may increase the temperature inside a building such that it is required to air condition the building. Even during the winter months in cold climates it is still necessary, in some instances, to air condition due to the increased heat caused by the intensity of the sun. Accordingly it is desirable to provide window blinds that are adjustable so that the windows can be totally or partially covered during the heat of the day to help control the temperature in the room. Further, it is desirable if these adjustments are done automatically without human intervention.

Various devices for automatically opening and closing blinds have been proposed. Typically these devices include control systems, which are either open loop or closed loop systems, connected to a blind.

Open loop systems operate by comparing the input signal with a predetermined reference level. The input signal is obtained from a sensor which measures the light intensity or temperature or both. There are typically two predetermined levels, one for a light threshold and the other for a dark threshold. When the input signal is above or below the predetermined levels a motor is actuated until a limit switch prevents further travel and accordingly the blind is either opened or closed respectively. For example, U.S. Pat. No. 2,962,647 issued to Borenstein on Nov. 29, 1960; U.S. Pat. No. 3,294,150 issued to Thomas on Dec. 27, 1966; U.S. Pat. No. 4,727,918 issued to Schroeder on Mar. 1, 1988; and U.S. Pat. No. 4,864,201 issued to Bernot on Sep. 5, 1989 show open loop systems. One drawback of all open loop systems is that inherently they only have two positions corresponding to the blinds being fully opened or fully closed.

Closed loop systems differ from open loop systems in that they inherently have the ability to have a number of output positions. Closed loop systems operate by sensing the light level within a room and moving the window covering to control the amount of light which enters the room. These systems include a feedback loop as part of the control system. Two such systems are shown in U.S. Pat. No. 3,294,152, issued to Kuijvenhoven on Dec. 27, 1966; and U.S. Pat. No. 3,646,985, issued to Klann on Mar. 7, 1972. These two systems include a light sensor as part of the feedback loop which measures the light intensity in the room and feeds this signal back to the control circuitry. Both of these systems use limit switches to set the position of the blind including the extreme open and closed positions.

It is desirable to have a system that rather than monitoring the light level in a room, monitors or senses the light at the outside of the blind and then sets the position of the blind. With a system that sets the position of the blind, the system may be designed so that a person in the room can easily adjust the system to meet their lighting needs. Further, it is desirable to provide a system having an optional safety feature in which at night the blinds are fully closed. Further, it is desirable to provide a system wherein there is a large variety of positions for the blind.

Taken alone or in combination none of the above mentioned prior art systems teach a system that sets the position of the blind based on the intensity of the sunlight, that a user can easily adjust the position of the blind, that has a closed position in the dark, and that has a large variety of positions.

SUMMARY OF THE INVENTION

The present invention provides a photosensitive automatic controller for use with window coverings in particular for use with venetian blinds having an opening and closing device. The controller includes a reversible motor, a drive circuit, a photosensitive sensor, a user input, a control circuit, a command circuit and a feedback sensor. The reversible motor is operably connected to the opening and closing device and it has a predetermined range from open to closed which corresponds to the window covering being fully opened and fully closed. The drive circuit is operably connected to the motor for generating a drive signal which drives the motor in a predetermined range from opened to closed. The photosensitive sensor measures the intensity of the sunlight and responsively generates a sensor signal. The user input generates an input signal. The control circuit is operably connected to the photosensitive sensor and the user input and the sensor signal is combined with the input signal to produce a control signal. The feedback sensor is operably connected to the opening and closing device and generates a feedback signal. The command circuit is operably connected to the drive circuit, control circuit and feedback sensor and compares the feedback signal to the control signal and produces a command signal which is transmitted to the drive circuit. The controller is a closed loop system.

In another aspect of the invention the controller includes a dark threshold comparator to compare with the sensor signal and to ensure that at night when it is dark the blinds are closed.

In another aspect of the invention the controller may be adapted so that a series of blinds may be ganged together with one blind being a master and the remaining being slaves.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 1 is a front view of the photosensitive automatic blind controller of the present invention attached to a horizontal blind;

FIG. 3 is an enlarged cross sectional view of the head of the blind taken along line 3—3 of FIG. 1;

DETAILED DESCRIPTION OF THE INVENTION

Figure 2:
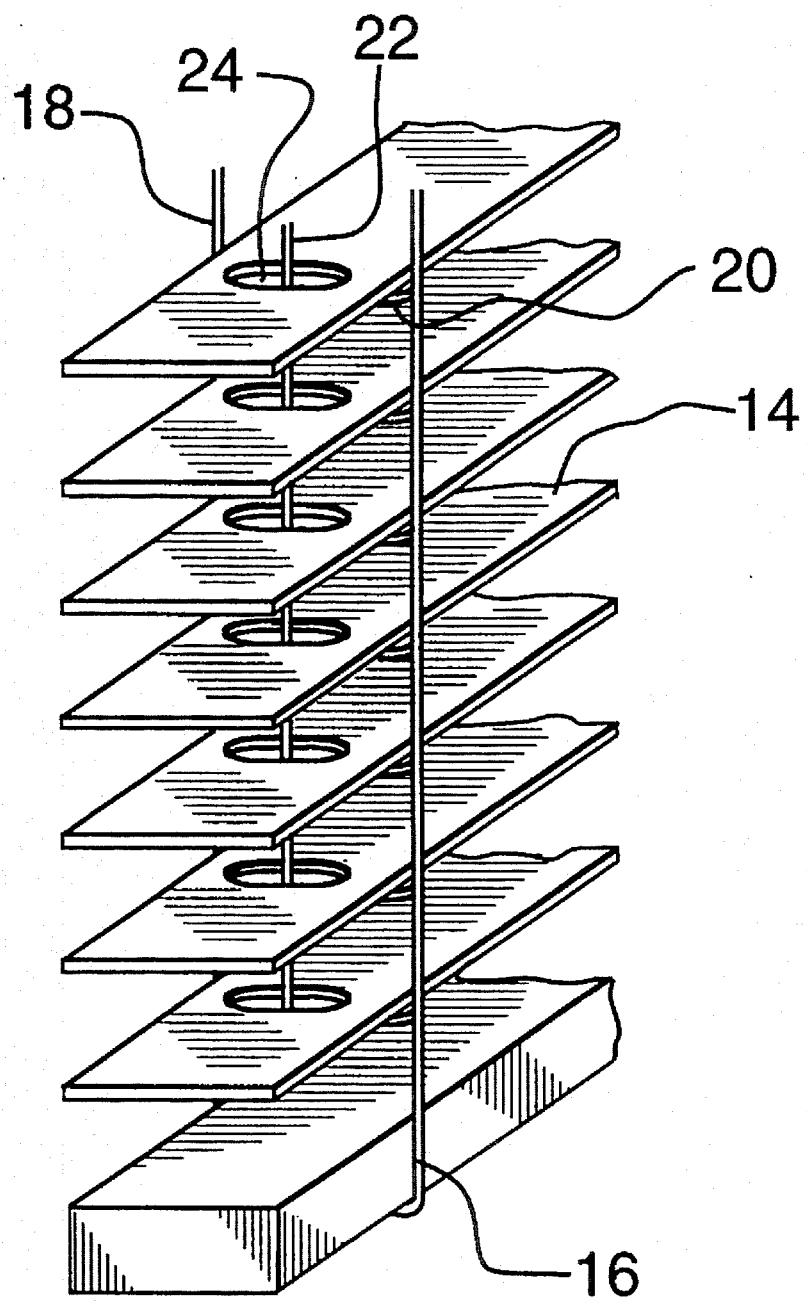
FIG. 2 is an enlarged broken away perspective view of the lower portion of the blind.

Referring to the drawings and in particular to FIG. 1, a photosensitive automatic blind controller and blind is shown generally at 10. The photosensitive automatic blind controller of the present invention is shown and described in conjunction with a horizontal type blind. It will be appreciated by those skilled in the art that alternatively the controller could be attached to other types of window coverings.

Horizontal blinds are well known to those skilled in the art and will only be discussed briefly hereafter. Horizontal blind 12 includes a plurality of horizontal slats 14, at least two pairs of front and back vertical cords 16 and 18 respectively and lateral cords 20 as can best be seen in FIG. 2. Lateral cords 20 are attached to front and back vertical cords 16 and 18, extend therebetween and are in spaced relation. A lateral cord 20 is positioned under each slat 14. At least a pair of vertical positioning cords 22 are each positioned in an aperture 24 which is laterally in the centre of each slat 14 proximate to each end thereof. Vertical positioning cords 22 keep slats 14 in alignment and may be used to raise and lower blind 12.

The slope of lateral cord 20 determines the slope of slat 14. The slope of lateral cords 20 is controlled by vertical cords 16 and 18. By raising front vertical cords 16 and correspondingly lowering back vertical cords 18 the angle of lateral cords 20 changes and correspondingly the angle of slats 14 changes.

Referring to FIG. 1, a blind head 26 is connected by a 4-wire bus 28 to the user input 30 which in turn is connected to an interface box 32 by a 4-wire bus 34. Interface box 32 is connected to a standard 120 volt AC to 12 volt DC converter which is shown here as power supply 36. The preferred user input 30 is a linear slide potentiometer which provides a user signal to the circuit. However a number of other user inputs could be used to provide a user signal to the circuit such as current loops, remote control, digital communication and other potentiometers. The particular user input would be chosen to meet the needs of the user.

Referring to FIG. 3, blind head 26 includes a blind shaft or tilt rod 38, a reversible motor and gearhead 40, a control circuit 42, two couplings 44 and a feedback potentiometer 46. A photosensitive sensor 48 is positioned in blind head 26 to face the window so that it can monitor the sun intensity and transmit a sensor signal to control circuit 42. Sensor 48 may be mounted in the blind head 26 as shown in FIG. 3 or it may be mounted remotely. Couplings 44 connect blind shaft 38 to motor 40. Blind couplings, (not shown) which are part of all standard horizontal blinds connect blind shaft 38 to vertical cords 16 and 18 (shown in FIGS. 1 and 2) which in conjunction with lateral cord 20 control the slope of slats 14. Motor and gearhead 40 drive blind shaft 38. Feedback potentiometer 46 monitors the position of blind shaft 38 and translates that position into a position signal which is used by control circuit 42 to determine if the blind shaft 38 should be adjusted. This will be described in more detail below. A phone jack type connection 50 is used to connect reversible DC motor 40 and control circuit 42 to 4-wire bus 28.

Figure 4:
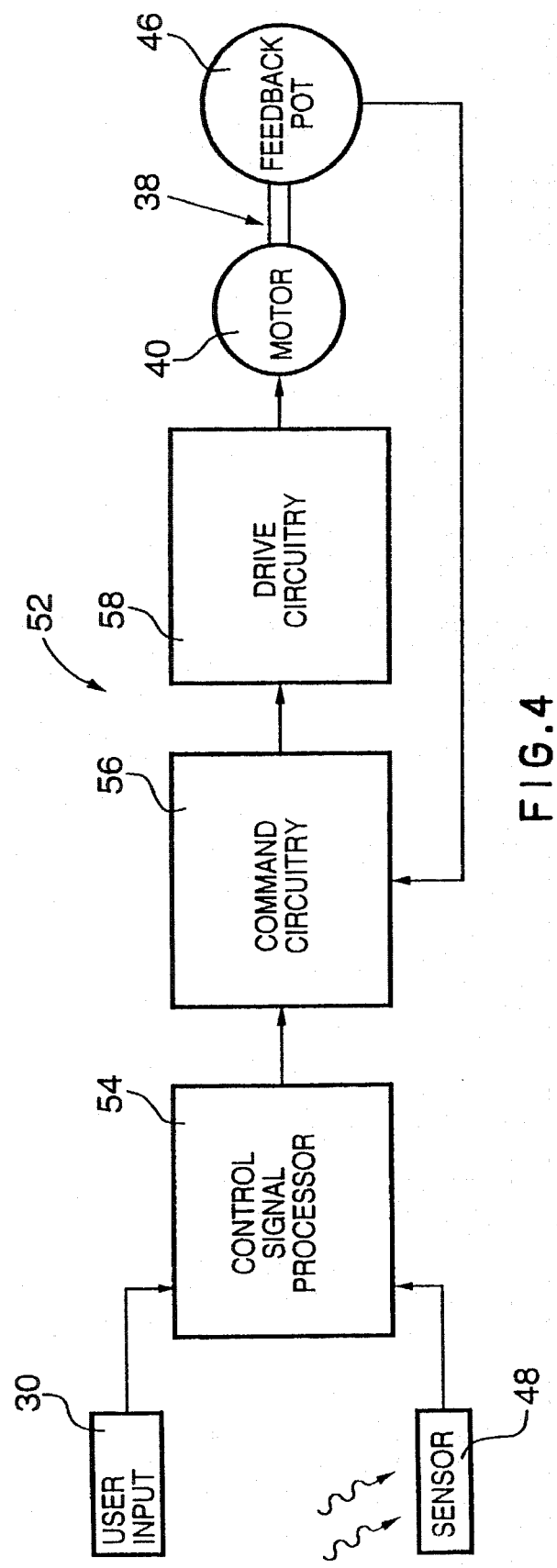
FIG. 4 is a block diagram of the circuitry of the photosensitive automatic blind controller of the present invention.

A block diagram of the circuitry of the photosensitive automatic blind controller is shown generally at 52 in FIG. 4. The circuitry includes user input 30, sensor 48, control signal processor 54, command circuitry 56, drive circuitry 58, reversible motor 40 and feedback potentiometer 46. Control circuit 42 discussed above includes the control signal processor 54, command circuitry 56 and drive circuitry 58.

Control signal processor 54 produces a control signal which is the weighted sum of the signal from the sensor 48 and the signal from the user input 30. The signals from the user input 30 are weighted to determine their relative influence over the output of control processor 54. Typically the weighting factor for the user input is sufficiently high so that the user can override the effect of sensor 48. The weighting factor for sensor 48 determines the bandwidth for the weighted signal which determines the degree of change in the intensity of the sun necessary to affect control signal which in turn causes the blinds to change position.

In addition control signal processor 54 may include a comparator which compares the signal from the sensor 48 to a dark threshold level. Where the sensor signal is below the dark threshold the control signal will indicate that the blinds should be closed. This feature is optional and may be of the greatest relevance for residential use.

Optionally the signal from the sensor is filtered such that the intensity of the light must change for a predetermined amount of time before it will affect the control signal. This may be done by way of a low pass RC filter or by way of a variable low pass RC filter wherein the user can vary the cutoff frequency. This feature provides that the intensity of the light must vary for a predetermined time before the angle of the blind will change and therefore if something blocks the sun for a short period of time it will not affect the angle of the blind.

As discussed above, feedback potentiometer 46 provides a position signal, which relates to the position of drive shaft 38 of blind and which corresponds to the position of the blind between fully opened and fully closed. Command circuitry 56 compares control signal to position signal to determine if the slope of the slats 14 should be adjusted. When command circuitry 56 determines that the slope of the slats 14 should be adjusted a signal is transmitted from there to drive circuitry 58. Drive circuitry 58 processes the signal and activates reversible motor 40 in the appropriate direction to either open or close the blinds.

Figure 5:
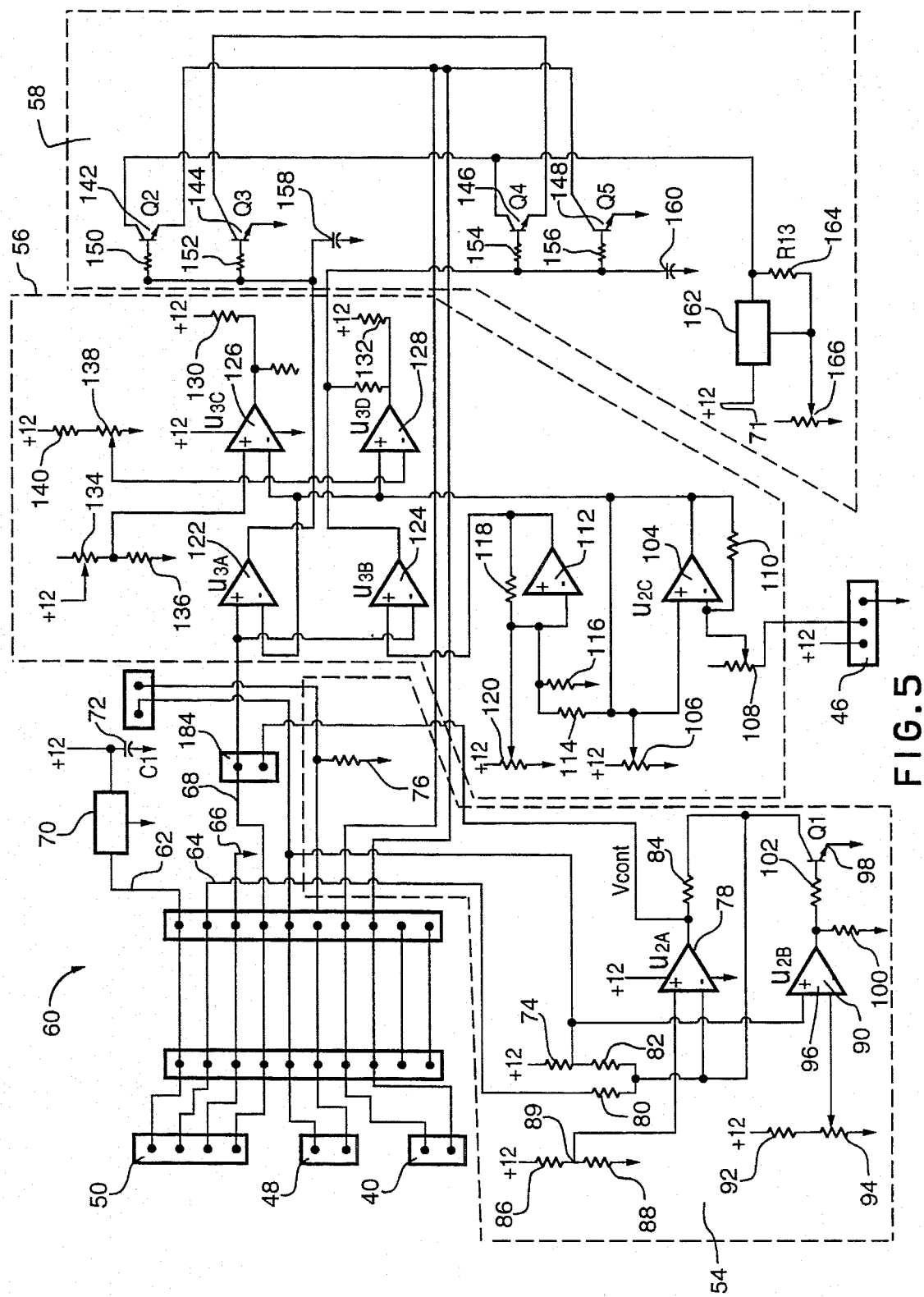
FIG. 5 is a circuit diagram of the circuitry of the present invention.

The operation of the photosensitive blind controller of the present invention can be described with reference to a circuit diagram shown generally at 60 in FIG. 5. Drive circuit 58, command circuitry 56, control signal processor 54 of FIG. 4 are shown in the circuit diagram of FIG. 5 in broken boxes. Phone jack 50 includes a 4-wire bus. Wire 62 carries the system power, wire 64 carries user input signal, wire 66 is the ground and wire 68 carries the control signal.

A voltage regulator 70 regulates the system power which is provided at 71 for the circuit. Capacitor 72 filters and smooths the system power.

User input signal varies between 0 and 12 volts and is transmitted to the 4-wire bus by a linear slide potentiometer, as described above, which acts as a voltage divider.

Photosensitive sensor 48 is a cadmium sulphide light dependent resistor and is part of a voltage divider network which also includes resistors 74 and 76. This voltage divider network creates a sensor signal which varies inversely with the light intensity (as the light intensity increases the sensor signal decreases).

Standard op-amp 78 sums the user input signal with the sensor signal using summing resistors 80 and 82 and produces the control signal. Resistor 84 is a feedback resistor and op-amp 78 is coupled to a voltage divider consisting of resistors 86 and 88. The mid-way point of the voltage divider is where resistor 86 equals resistor 88 and will be considered the system ground or V0 and is shown at 89. The voltage mid point of op-amp 78 is at V0 and is 0 voltage with respect to the system ground. Thus for a 0–12 volt system the mid way point or ground level is +6 volts. This level corresponds to the midway point of the blinds and can be designated as zero and the reference level of the system voltage varies from –6 to +6.

To provide the feature where the blinds will be closed at night, the sensor signal is also input into an op-amp 90 which acts as a simple comparator. Resistor 92 and potentiometer 94 act as a voltage divider wherein the potentiometer may be adjusted to set a dark threshold level. That is when sensor signal rises above the voltage on pin 96 on op-amp 90, the output of op-amp 90 goes to +6 volts which turns on transistor 98. This causes the negative input of op-amp 78 to go to –6 volts which in turn causes the output of op-amp 78 (the control signal) to go to +6 volts. This causes the blinds to go to the fully closed position. Resistor 100 is a load resistor for op-amp 90 and resistor 102 limits the current into the base of transistor 98.

Optionally, to provide the feature of providing a predetermined time that the light intensity must vary before it affects the control signal, a filter (not shown) may be positioned between resistor 74 and resistor 82. The filter may be an RC filter or a variable RC filter.

Feedback potentiometer 46 is connected to the blind shaft 38 and is connected to act as a simple voltage divider to provide the shaft position signal. Op-amp 104 is used to condition shaft signal which in turn becomes the conditioned position signal. Potentiometer 106 offsets the output of op-amp 104 so that when the blinds are at the midway point the position signal is 0 volts. Potentiometer 108 is used to set the range of position signal so that it will vary from +3 volts to –3 volts when the blinds are fully closed and opened respectively. Resistor 110 is a feedback resistor. Op-amp 112 is used to subtract a constant voltage from the conditioned position signal to provide a lower conditioned position signal. Resistors 114, 116 and 118 configure op-amp 112 as a subtracter. Potentiometer 120 is used to set the amount of DC voltage subtracted from the conditioned position signal. The difference between the conditioned position signal and lower conditioned position signal determines the size of the hysteresis or deadband that is the amount of change in the control signal which is required before the blind will be moved by motor 40. As an example, when the blinds are fully closed the conditioned position signal is +3 volts relative to 0 volts (referred to as V0) and when the blinds are fully opened the conditioned position signal is –3 volts relative to V0. When the blinds are at the midway point the conditioned position signal is 0 volts relative to V0.

A quad voltage comparator comprising comparators 122, 124, 126 and 128, which in conjunction with the conditioning of the position signal serves as command circuitry 56. The control signal is fed into the positive and negative inputs of comparators 122 and 124 respectively where it is compared to the conditioned position signal and the lower conditioned position signal. When the control signal is between the conditioned position signal and the lower conditioned position signal the control signal is in the deadband and the system is stable and the motor is at rest. The outputs of comparators 122 and 124 are the close and open drive signals. These outputs are open collector outputs and therefore will not pull up to +6 volts (+12 volts relative to system ground) unless the outputs of comparators 126 and 128 are on. Comparators 126 and 128 are also open collector outputs which are permanently pulled up to +6 volts by resistors 130 and 132. Comparators 126 and 128 are used to set the open and closed limits of the blind. The conditioned position signal is compared to the reference voltages set by the voltage dividers; potentiometer 134 and associated resistor 136 and potentiometer 138 and associated resistor 140. If the conditioned position signal exceeds the limits set by potentiometer 134 or potentiometer 138 the corresponding drive signal cannot be asserted. As long as the conditioned position signal is within the limits set by potentiometers 134 and 138 the motor 40 will be activated. When the control signal is greater than conditioned position signal comparator 122 turns on which is the close drive signal. When the control signal is less than conditioned position signal comparator 124 turns on which is the open drive signal.

The drive circuitry consists of four transistors 142, 144, 146 and 148 four current limiting resistors 150, 152, 154 and 156, and two capacitors 158 and 160 for smoothing the drive signal. When the control circuitry transmits either an open or close signal, the corresponding transistors turn on 150 and 152 for open and 154 and 156 for close. This causes the voltage set by adjustable voltage regulator 162 used in conjunction with resistor 164 and potentiometer 166 to be delivered to the motor 40. The sense of the voltage is reversed from open to closed in order to reverse the direction of rotation of reversible motor 40.

Motor 40 is indirectly coupled to feedback potentiometer 46 so that when motor 40 rotates the position of the wiper on the feedback potentiometer changes thereby altering the shaft signal which in turn alters the position signal.

It will be appreciated by those skilled in the art that there are a number of variations to the circuit which will produce the same results.

Figure 7:
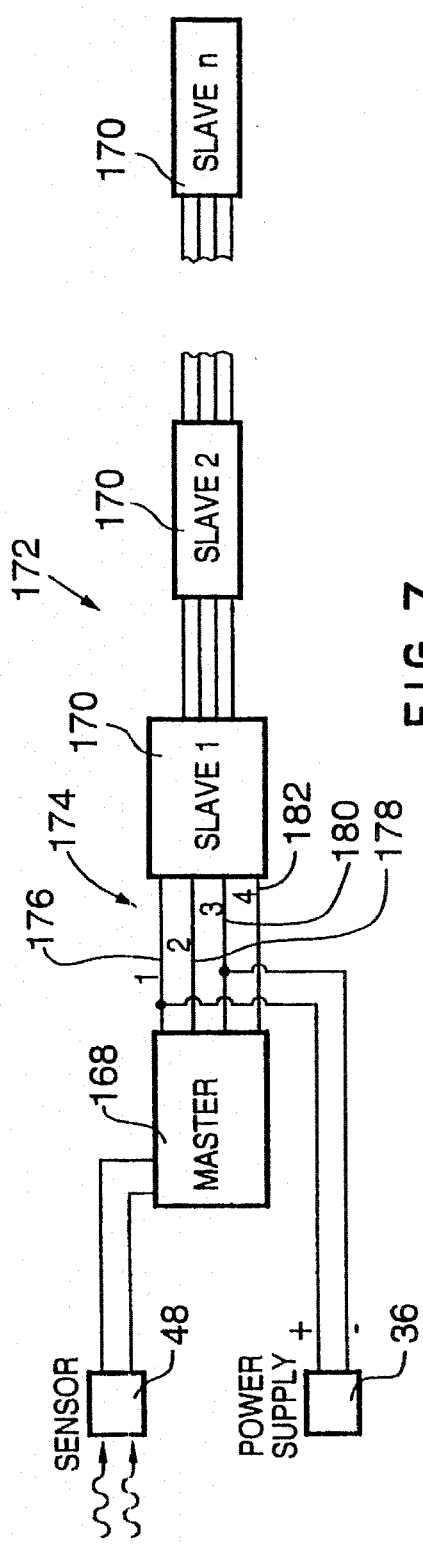
FIG. 7 is a block diagram of the circuitry for a plurality of blinds.
Figure 6:
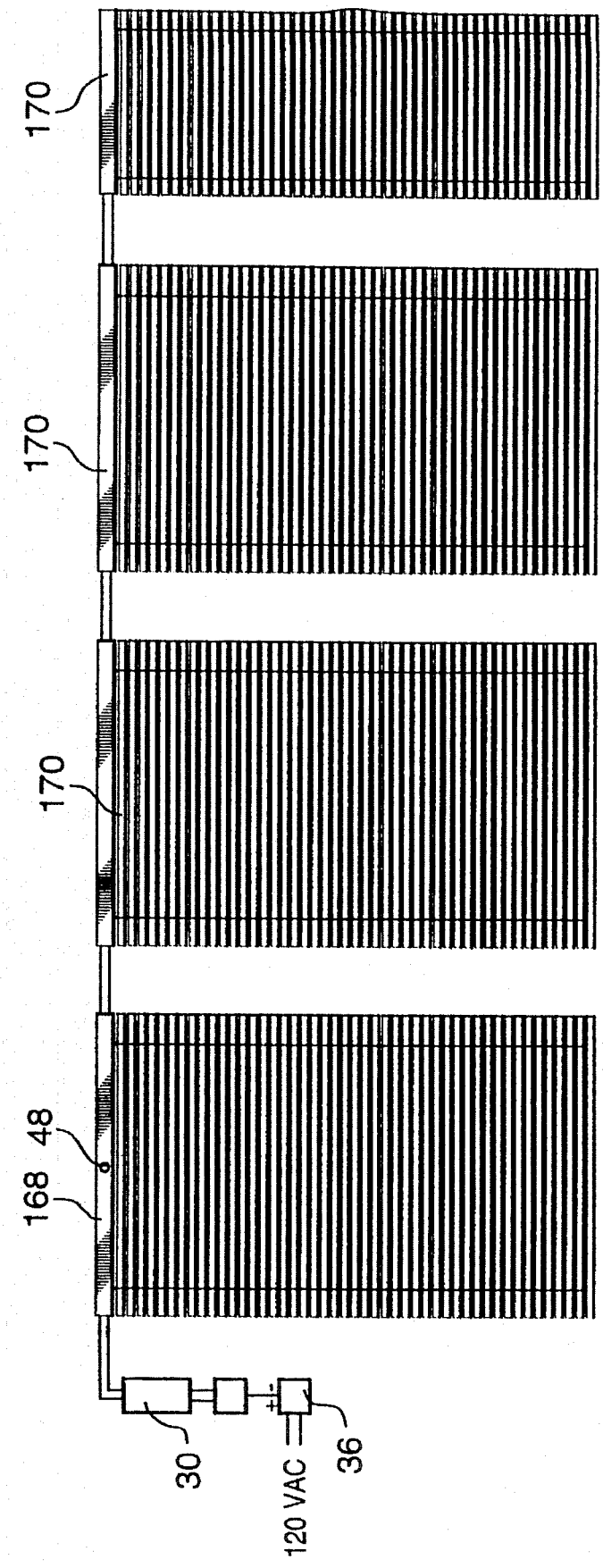
FIG. 6 is a front view of the photosensitive automatic blind controller of the present invention attached to a plurality of horizontal blind.

The photosensitive automatic blind controller of the present invention may be adapted to be attached to multiple blinds as shown in FIG. 6. The blind attached to the power supply 36, user input 30 and sensor 48 is the master blind 168 and the remaining blinds are slave blinds 170. The circuitry in master blind 168 provides the control signal to slave blinds 170. FIG. 7 shows a block diagram of the master/slave relationship generally at 172.

The circuitry of the slaves is similar to that described above and shown in FIG. 5 however jumper 184 and the generation of control signal 54 would not be included.

Master blind 168 is connected to the next adjacent slave 170 by a 4-wire bus 174. Wire 176 transmits the system power, wire 180 transmits the ground and wire 182 transmits the control signal. Wire 178 transmits the user input signal, however the slave circuit does not use this signal to determine the position of the slave blind and if desired user input signal need not be transmitted to the slave. The control signal is calculated by the master 168. Adjacent slaves are also connected by 4-wire buses having similar configurations. The number of slaves which may be connected to the master is determined by the power supply and as long as there is sufficient power on the bus any number of slaves may be ganged together.

Figure 8:
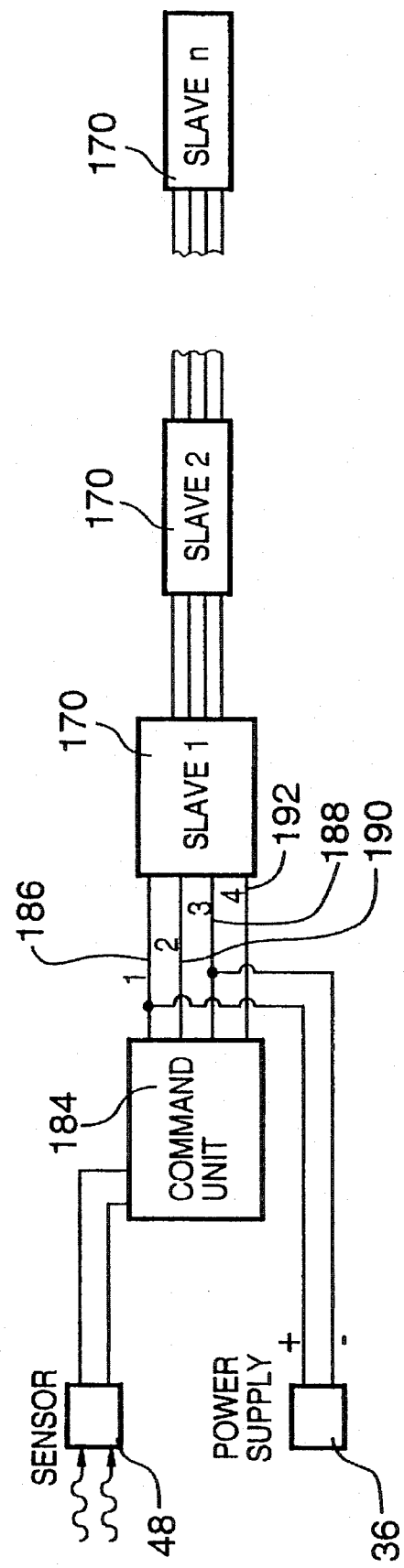
FIG. 8 is a block diagram of an alternate circuitry for a plurality of blinds.

FIG. 8 shows an alternate embodiment of a plurality of blinds ganged together. All of the blinds are slaves blinds 170 having slave circuitry as described above. A command unit 184 is connected to the first slave blind 170. The 4-wire bus between command unit 184 and slave blinds and between adjacent slave blinds 170 have four wires wherein wire 186 transmits the system power, wire 188 transmits the ground and wire 190 transmits the control signal. The fourth wire 192 may transmit the sensor signal. Command unit 184 includes a user input 30 and a control signal process 54 both as described above. A sensor 48 is electrically connected to command unit 184 it may be connected directly, as shown in FIG. 8, or through a slave blind 170 (not shown) wherein fourth wire 192 transmits the sensor signal. One or more slave blind may be attached to command unit 184 and the number of slave blinds 170 which may be ganged together is limited by the power supply. The advantage of this embodiment is that all of the blinds are slave blinds and therefore all of the blinds are the same which will simplify the manufacturing of blinds.

The present system has a number of advantages. The present system sets the angle of the blind based on the intensity of the outside light rather than the intensity of the light in the room. The present system is designed so that a user may set the blinds so that they will tend to be opened or tend to be closed. The present system has what could be considered an infinite number of settings between fully opened and fully closed rather than limit switches which position the blind in predetermined settings.

It will be appreciated that the above description is related to one embodiment by way of example only. Many variations on the invention will be obvious to those skilled in the art and such obvious variations are within the scope of the invention as described herein whether or not expressly described.

What is claimed as the invention is:

1. A photosensitive automatic controller connected to a power supply for use with a window covering having an opening and closing device, comprising:

a reversible motor operably connected to the opening and closing device having a predetermined range from open to closed corresponding to the window covering being fully opened and fully closed;

a drive circuit operably connected to the reversible motor for generating a drive signal which drives the motor in a predetermined range from fully opened to fully closed;

a photosensitive sensor for generating a sensor signal;

user input means for generating an input signal;

a control signal processor operably connected to the photosensitive sensor and the user input means wherein the sensor signal is combined with the input signal to produce a control signal;

a feedback sensor operably connected to the opening and closing device for generating a feedback signal which corresponds to the position of the opening and closing device;

a command circuit operably connected to the drive circuit, the control signal processor and the feedback sensor for comparing the feedback signal to the control signal and producing a command signal and transmitting the command signal to the drive circuit.

2. A photosensitive automatic controller according to claim 1 wherein said control signal processor comprises a dark threshold comparator and wherein said dark threshold comparator compares the sensor signal to a dark threshold level, and where the sensor signal is below the dark threshold level, the control signal shall indicate that the window covering should be fully closed.

3. A photosensitive automatic controller according to claim 1 wherein the sensor signal must vary a predetermined amount before it affects the control signal.

4. A photosensitive automatic controller according to claim 2 wherein the sensor signal must vary a predetermined amount before it affects the control signal.

5. A photosensitive automatic controller according to claim 1 wherein the user input means is a linear slide potentiometer.

6. A photosensitive automatic controller according to claim 1 wherein the photosensitive sensor is a cadmium sulphide light dependent resistor.

7. A photosensitive automatic controller according to claim 1 wherein the user input means, the control signal processor and the photosensitive sensor together form a command unit and the reversible motor, the drive circuit, the feedback sensor and then the command circuit form a slave.

8. A photosensitive automatic controller according to claim 7 further including a plurality of slaves operably connected to the command unit.

9. A photosensitive automatic controller according to claim 2 wherein the user input means, the control signal processor and the photosensitive sensor together form a command unit and the reversible motor, the drive circuit, the feedback sensor and then the command circuit form a slave.

10. A photosensitive automatic controller according to claim 9 further including a plurality of slaves operably connected to the command unit.

11. A photosensitive automatic controller according to claim 3 wherein the user input means, the control signal processor and the photosensitive sensor together form a command unit and the reversible motor, the drive circuit, the feedback sensor and then the command circuit form a slave.

12. A photosensitive automatic controller according to claim 11 further including a plurality of slaves operably connected to the command unit.

13. A photosensitive automatic controller according to claim 4 wherein the user input means, the control signal processor and the photosensitive sensor together form a command unit and the reversible motor, the drive circuit, the feedback sensor and then the command circuit form a slave.

14. A photosensitive automatic controller according to claim 13 further including a plurality of slaves operably connected to the command unit.

15. A photosensitive automatic controller according to claim 1 wherein the photosensitive automatic controller is a master and further including at least one slave and associated window covering wherein the master transmits to the slave a control signal and wherein the slave comprises a reversible motor operably connected to an opening and closing device having a predetermined range from open to closed corresponding to the associated window covering being fully opened and fully closed wherein a drive circuit is operably connected to the reversible motor for generating a drive signal which drives the motor in a predetermined range from opened position to closed position; feedback sensor operably connected to the opening and closing device for generating a feedback signal; a command circuit operably connected to the drive circuit, the master, and the feedback sensor for comparing the feedback signal to the control signal and producing a command signal and transmitting the command signal to the drive circuit.

16. A photosensitive automatic controller according to claim 2 wherein the photosensitive automatic controller is a master and further including at least one slave wherein the master transmits to the slave a control signal and wherein the slave comprises a reversible motor operably connected to an opening and closing device having a predetermined range from open to closed corresponding to the corresponding window covering being fully opened and fully closed wherein a drive circuit is operably connected to the reversible motor for generating a drive signal which drives the motor in a predetermined range from opened position to closed position; feedback sensor operably connected to the opening and closing device for generating a feedback signal; a command circuit operably connected to the drive circuit, the master, and the feedback sensor for comparing the feedback signal to the control signal and producing a command signal and transmitting the command signal to the drive circuit.

17. A photosensitive automatic controller according to claim 3 wherein the photosensitive automatic controller is a master and further including at least one slave wherein the master transmits to the slave a control signal and wherein the slave comprises a reversible motor operably connected to an opening and closing device having a predetermined range from open to closed corresponding to the corresponding window covering being fully opened and fully closed wherein a drive circuit is operably connected to the reversible motor for generating a drive signal which drives the motor in a predetermined range from opened position to closed position; feedback sensor operably connected to the opening and closing device for generating a feedback signal; a command circuit operably connected to the drive circuit, the master, and the feedback sensor for comparing the feedback signal to the control signal and producing a command signal and transmitting the command signal to the drive circuit.

18. A photosensitive automatic controller according to claim 4 wherein the photosensitive automatic controller is a master and further including at least one slave wherein the master transmits to the slave a control signal and wherein the slave comprises a reversible motor operably connected to an opening and closing device having a predetermined range from open to closed corresponding to the corresponding window covering being fully opened and fully closed wherein a drive circuit is operably connected to the reversible motor for generating a drive signal which drives the motor in a predetermined range from opened position to closed position; feedback sensor operably connected to the opening and closing device for generating a feedback signal; a command circuit operably connected to the drive circuit, the master, and the feedback sensor for comparing the feedback signal to the control signal and producing a command signal and transmitting the command signal to the drive circuit.

* * * * *